UNITED STATES PATENT OFFICE.

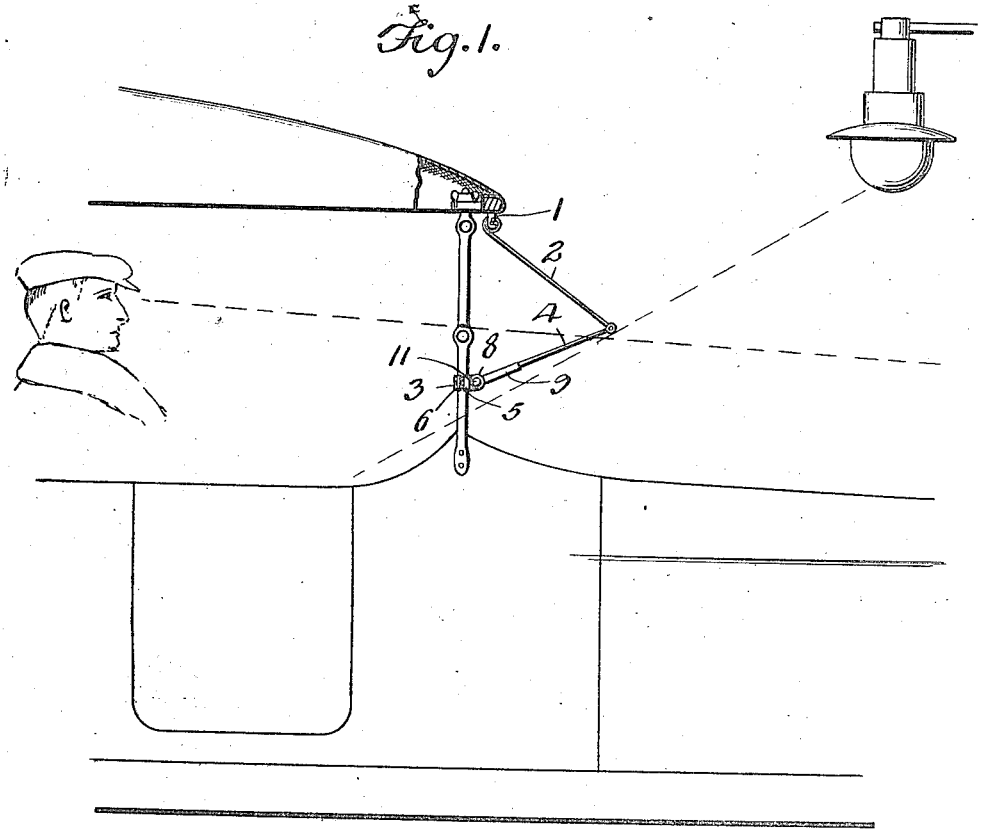
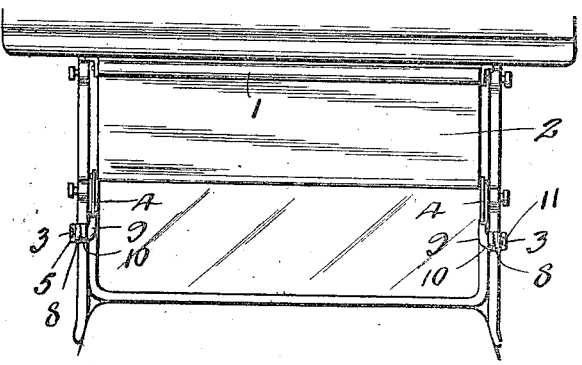

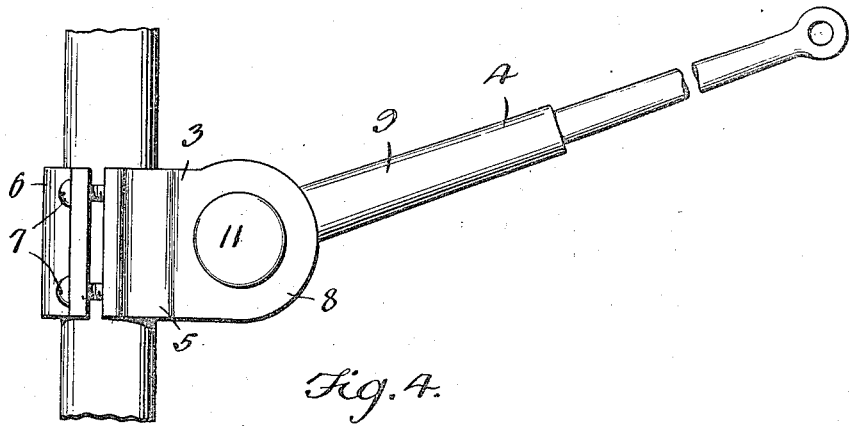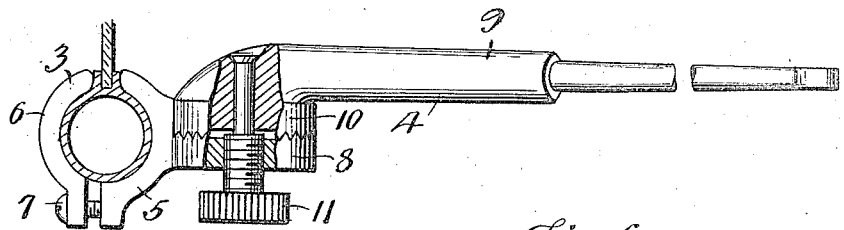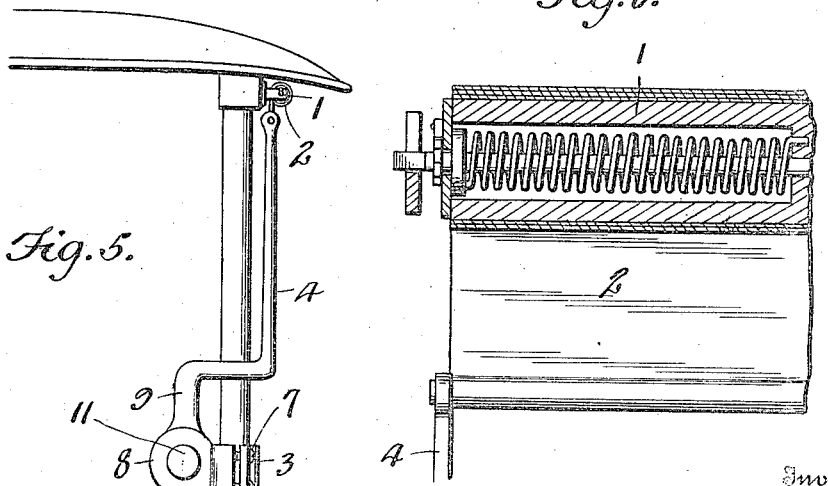

WILLIAM L. SCOTT, OF CINCINNATI, OHIO.

RAIN-SHIELD FOR AUTOMOBILES.

1,238,579. Specification of Letters Patent. Patented Aug. 28, 1917.

Application filed March 1, 1916. Serial No. 81,517.

*To all whom it may concern:*

Be it known that I, WILLIAM L. SCOTT, a citizen of the United States, residing at Cincinnati, in the county of Hamilton and State of Ohio, have invented new and useful Improvements in Rain-Shields for Automobiles, of which the following is a specification.

This invention relates to rain shields especially adapted to be used upon automobiles and it consists in the novel features hereinafter described and claimed.

In brief the structure of the invention includes a flexible curtain mounted upon a spring acutated roller attached to the top of the automobile above the upper edge of the wind shield thereof and which may be extended in an inclined position in advance of the glass of the wind shield to prevent snow or rain from depositing in excessive quantities upon the glass of the wind shield and thereby obscuring vision therethrough and also the said curtain may serve as means for shading the eyes of the operator of the automobile to prevent the glare of street lamps from striking his eyes and thereby causing confusion which might result in accidents.

It is well known to those who have been compelled to operate automobiles in the rain and at night that there are two serious objections to the use of a wind shield, one being the fact that the rain or snow accumulates upon the glass and obscures the vision and the other is that the accumulation of the said rain or snow upon the glass of the wind shield produces upon the eyes of the operator when approaching a street lamp a glare or strain which obscures the vision and renders the proper operation of the machine difficult and dangerous. On approaching a street lamp when the wind shield is covered with rain drops it is almost impossible to distinguish an object as large as a man even though he may be only a few feet in front of the machine.

It is the primary object of the invention to deflect most of the rain or snow that would otherwise deposit on the glass of the wind shield as it readily does where the speed of the machine is not in excess of approximately eighteen miles per hour. At higher rates of speed the water will accumulate in thin films on the glass at a point slightly higher than the lower edge of the curtain used in the present invention. Therefore, when the present device is used the curtain is lowered until its lower edge is slightly below the level of the eye of the operator of the automobile and this permits ample vision of the street but prevents the rays of light from an elevated street lamp from striking the eyes of the operator.

In the accompanying drawings:—

Figure 1 is a side view of a part of an automobile showing the rain shield applied and indicating the manner in which it protects the eyes of the operator from the glare of an elevated lamp.

Fig. 2 is a front view of the shield.

Fig. 3 is a side elevation of parts thereof.

Fig. 4 is a fragmentary plan view with parts in section.

Fig. 5 is a side view of a modified form of the shield.

Fig. 6 is a detailed sectional view of parts of the shield.

The shield includes a spring actuated roller 1 which is journaled at the upper forward portion of the top of the automobile and upon which is wound a curtain 2 of rubber or other similar flexible material. Clips 3 are attached to the uprights of the top of the automobile and an awning frame 4 is pivoted in the said clips. The intermediate portion of the frame 4 is connected with the lower portion of the curtain 2.

In the form of the invention as shown in Fig. 3 the clips 3 include members 5 and 6 connected together by means of screws 7. The uprights of the top of the automobile are received between the members 5 and 6 and by tightening the screws 7 the said members are clamped in position upon the said uprights. The members 5 are provided with corrugated extensions 8 and socket members 9 are provided with corrugated portions 10 which engage the corrugations of the extensions 8. Set screws 11 best shown in Fig. 4, connect the socket members 9 with the extensions 8 and may be tightened to hold the said parts at adjusted positions with relation to each other. The arms of the awning frame are supported in the socket members 9.

In the form of the invention as shown in Fig. 5 the extensions 8 are devoid of corrugations and the arms of the awning frame are provided with handles 12 which may be moved to positions in close proximity to the sides of the uprights which support the top of the automobile. The arms of the awning frame are connected with the extensions 8 by means of the set screws 11 which may be tightened to hold the said parts at adjusted position with relation to each other.

In all forms of the invention it will be observed that the awning frame may be swung in a downward direction whereby the curtain 2 is unrolled from the roller 1 and the curtain is positioned at an incline with relation to a horizontal and disposed in advance of the glass of the wind shield of the automobile. The lower edge of the curtain 2 may be carried down to any desired distance but it is preferable to carry the lower edge down to such an extent only as to prevent the rays of light from an elevated street lamp from striking the eyes of the operator of the automobile. When the curtain is so positioned and in the event that the weather is inclement the said curtain prevents the rain or snow from depositing in large quantities upon the glass of the wind shield and obstructing the vision therethrough. At the same time the said curtain prevents the rays of light from the elevated street lamp from striking the eyes of the operator of the automobile and thus blinding or confusing him.

In the day time or when it is not necessary to use the device the intermediate portion of the awning frame may be swung up toward the front edge of the top of the automobile and thus the spring which actuates the roller 1 will wind the curtain 2 upon the said roller and the parts will not interfere with the operation of the automobile in the usual manner.

From the foregoing description taken in connection with the accompanying drawing it will be seen that a simple and an efficient device is provided in the nature of an attachment for an automobile which prevents the glass of a wind shield from becoming obscured in inclement weather and also prevents the rays of light from an elevated street lamp from striking the eyes of an operator and blinding him or interfering with his vision to such an extent as to affect the proper operation of the automobile.

Having described the invention what is claimed is:—

A device of the character described comprising a spring actuated roller, a curtain arranged to wind thereon, a frame attached to the curtain, clips adapted to be applied to supports, said frame being pivotally connected with the clips, the arms of the frame being provided beyond the clips with handles whereby the frame may be swung with relation to the clips and means for securing the frame at adjusted positions with relation to the clips.

In testimony whereof I affix my signature in presence of two witnesses.

WILLIAM L. SCOTT.

Witnesses:
   TALTON E. LOSTETTER,
   W. R. ROSSETER.